(12) United States Patent
Gauthier

(10) Patent No.: US 6,651,581 B2
(45) Date of Patent: Nov. 25, 2003

(54) BACK-UP RANGE GUIDE FOR VEHICLES

(76) Inventor: Fernand Gauthier, 5221, Rodrigue, La Plaine, Québec (CA), J7M 2C1

( * ) Notice: Subject to any disclaimer, the term of this patent is extended or adjusted under 35 U.S.C. 154(b) by 53 days.

(21) Appl. No.: 10/073,379

(22) Filed: Feb. 12, 2002

(65) Prior Publication Data

US 2003/0150369 A1 Aug. 14, 2003

(51) Int. Cl.$^7$ ................................................ G01B 5/14
(52) U.S. Cl. ........................ 116/28 R; 33/264; 280/432; 293/126
(58) Field of Search ............................... 116/28 R, 56, 116/28 A; 33/264; 280/477, 432, 762, 770; 293/126, 128, 142

(56) References Cited

U.S. PATENT DOCUMENTS

| | | | |
|---|---|---|---|
| 2,927,310 A | * | 3/1960 | Knapp ........................ 340/431 |
| 3,820,065 A | | 6/1974 | Koplewicz et al. |
| 3,866,328 A | * | 2/1975 | Alexander et al. ............ 33/264 |
| 4,101,868 A | | 7/1978 | Bubnich et al. |
| 4,965,571 A | | 10/1990 | Jones |
| 5,894,673 A | * | 4/1999 | Pretsch, Jr. .................. 33/286 |

* cited by examiner

Primary Examiner—Christopher W. Fulton
Assistant Examiner—Tania C. Courson

(57) ABSTRACT

A vehicle back-up guide comprised of a lever arm which defines an abutting arm and a spacing arm angled relative to each other. The lever arm is pivotally mounted to a mounting means to the rear side of the vehicle. As the vehicle is backing-up and closing in on an object, the abutting arm, which has a distal end projecting substantially away from the vehicle, makes contact with the object and this automatically moves the spacing arm outwardly thus giving a visual indication of the relative distance of the vehicle to the object.

9 Claims, 2 Drawing Sheets

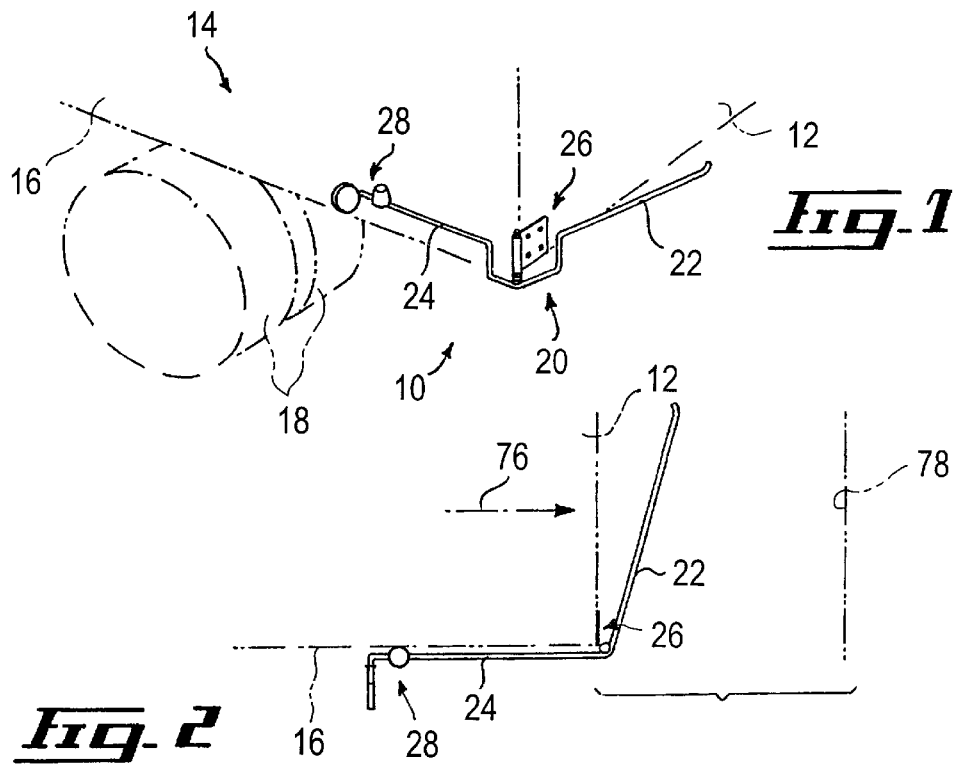
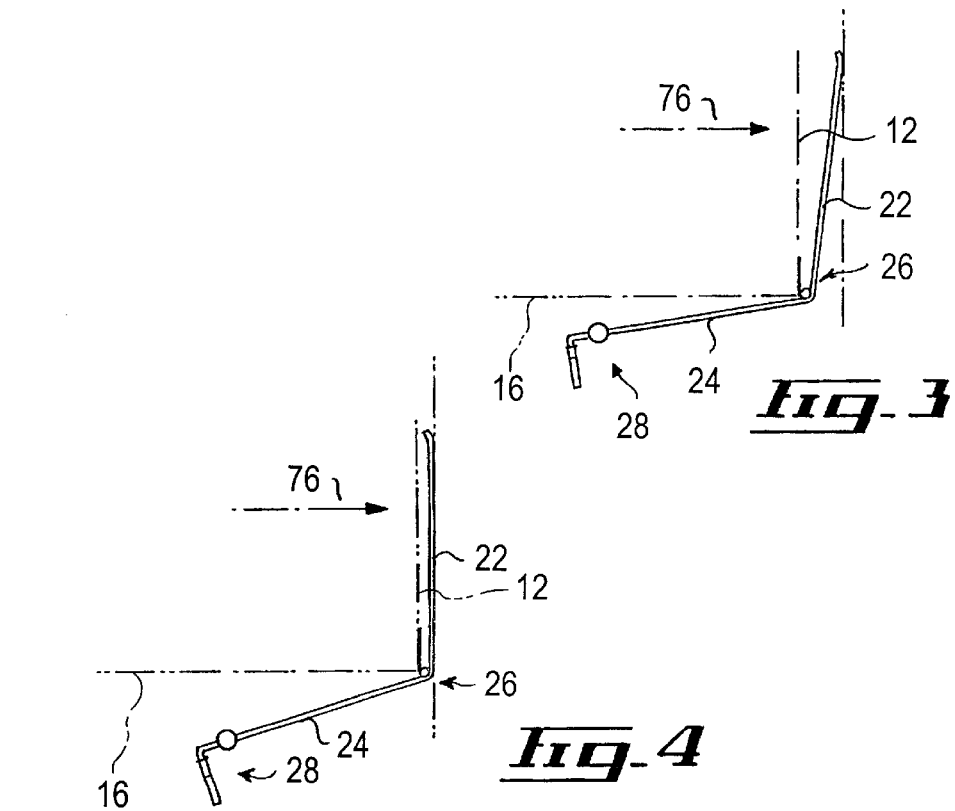

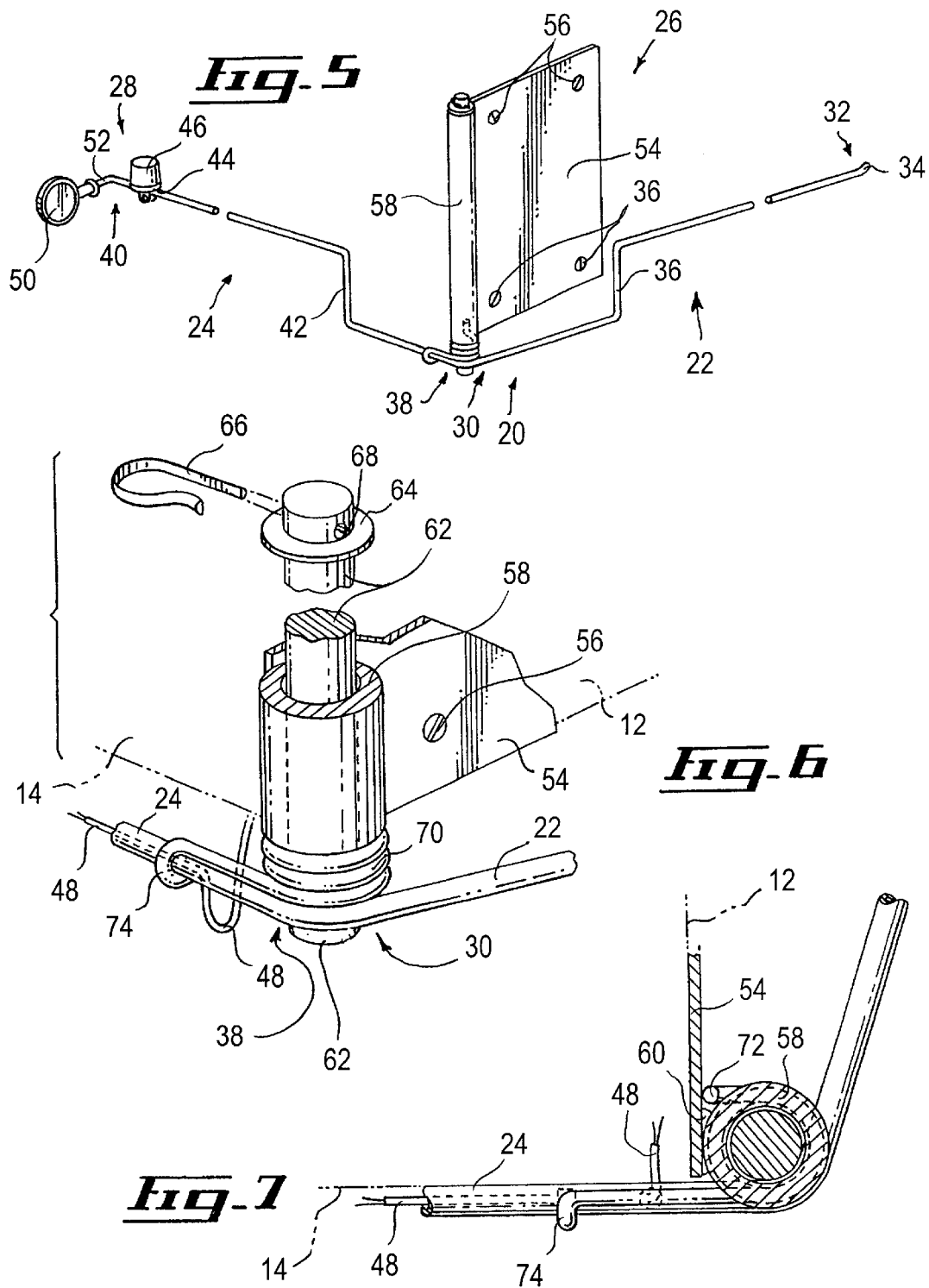

BACK-UP RANGE GUIDE FOR VEHICLES

FIELD OF THE INVENTION

The present invention relates to the general field of vehicle safety accessories and is particularly concerned with a vehicle's back-up range guide.

BACKGROUND OF THE INVENTION

The problems associated with blind spots while moving a vehicle in reverse have long been recognized. There have been repeated accidents associated with vehicles backing up involving personal injury and damage to property. Indeed, for nearly every licensed driver, it is known that positioning a vehicle while backing up requires considerable accuracy to avoid any damage to the surrounding areas or to the vehicle. For instance, the bumpers, fenders or grilles may easily be damaged by contact with a stationary rear wall particularly those which constitute projections or barriers which are ordinarily obscured from the driver's line of sight.

While it is difficult for the drivers of any vehicles to evaluate the distance between the rear of the vehicle and a rearwardly positioned obstacle, the problem is further compounded when backing up material hauling vehicles such as vans, semitrailers and other types of trucks used for transporting goods to a loading dock. The problem is compounded by the long length of the truck which increases the possibility that either or both the and the loading dock will be damaged.

Some documents found in the prior art address these types of problems. Indeed, the prior art has proposed technical aid to improve vision to the rear by short range obstacle or target detection and distance measurement devices. Some of these devices have been developed in recent years and introduced into the market. These devices generally fall into three categories. The first category involves obstacle systems using image sensors, infrared light, video or laser devices. A second category includes conductivity measurement systems and a third category involves ultrasound systems. Most of these so called relatively high-tech solutions, although offering many advantages, have proven to be costly and, hence, have not obtained commercial success.

Other types of systems using mechanical components have been proposed. However, those mechanically activated devices typically include a large number of operative components which are subject to mechanical breakdown. Moreover, they often require judgment and interpretation on the part of the driver. Another main drawback associated with both high-tech and mechanical devices relates to the fact that they are not always reliable and thus gives a false sense of security to the driver which may be considered worst than having no indicator device at all.

Accordingly, there exists a need for an improved back-up range guide for vehicles. Advantages of the present invention include the fact that the proposed back-up range guide for vehicles in accordance with the present invention allows the driver of a vehicle such as a truck who is backing up towards an obstacle such as a loading dock to conveniently and accurately determine, just by looking into the rear view mirror and without the assistance of additional personnel, the spacing between the back end of the truck and the loading dock as he or she backs towards the dock.

It is an object of this invention to allow continuous monitoring of the decreasing spacing between the back end of the truck and the loading dock, the proposed back-up range guide for vehicles in accordance with the present invention, reduces the risk of injury to occupants of the vehicle as well as people standing by and also reduces the risk of damage to both to the vehicle and the surrounding structures.

It is a further object of this invention to allow the driver to position the rear end of the truck at a suitable distance from a loading dock to facilitate ingress and egress of both goods and personnel between the truck and the loading dock without requiring increased operations.

It is yet another object of this invention to be retrofittable to most conventional vehicles. It is still another object of this invention to be fully reliable without requiring elaborate maintenance.

It is a final object of this invention to be manufacturable using conventional forms of manufacturing with relatively simple mechanical components thus providing a back-up range guide for vehicles that is economically feasible, long lasting and relatively trouble free in operation.

To accomplish this, back-up range guide for vehicles is comprised of an abutting arm and a spacing arm both set at a larger than perpendicular angle relative to each other and with the spacing arm situated on a lateral side of the truck while the abutting arm is situated at the backside of the vehicle. Thus as the vehicle closes in on an object, generally a building where there is a loading dock, the abutting arm, which has a distal end projecting substantially away from the vehicle, makes contact with the said object and is pushed towards the said vehicle. This automatically moves the spacing arm outwardly. By looking at the rearview mirror, the driver can clearly see the spacing arm moving progressively away from the side of the vehicle as it closes in on the object. This visual aid is further enhanced by the use of light emitting means and/or reflector. Additionally, a biasing means repositions the indicator back to its original configuration as the vehicle moves away from the object.

BRIEF DESCRIPTION OF THE DRAWINGS

FIG. 1: Is a partial perspective view with sections taken out, showing a back-up range guide for vehicles in accordance with an embodiment of the present invention mounted on the rear end of a truck, the truck being shown in phantom lines.

FIG. 2: Is a top view, showing the back-up range guide for vehicles shown in FIG. 1 mounted on the back end of the truck as the latter approaches a wall.

FIG. 3: Is a top view with sections taken out, showing the back-up range guide for vehicles shown in FIG. 2 as it initially contacts the wall shown in phantom lines.

FIG. 4: Is a partial top view with sections taken out, showing the back-up range guide for vehicles in its fully extracted configuration.

FIG. 5: Is a perspective view with sections taken out, showing the back-up range guide for vehicles in accordance with the present invention.

FIG. 6: In a partial perspective view with sections taken out, showing some of the linking components, part of the back-up range guide for vehicles in accordance with the present invention.

FIG. 7: Is a partial cross sectional view, showing some of the linking components of the back-up range guide for vehicles shown in FIG. 6.

DETAILED DESCRIPTION

Referring to FIG. 1, there is shown a back-up range guide for vehicles 10 in accordance with an embodiment of the present invention. The back-up range guide 10 is shown attached to the backside 12 of a schematized partly shown truck 14. It should be understood that the back-up range guide 10 could be attached to other types of vehicles and at other locations on such vehicles without departing from the scope of the present invention. The truck 14 shown in FIGS. 1 through 4, also defines a lateral side 16 and a set of supporting wheels 18. The back-up range guide 10 includes a generally "L" shaped lever arm 20 defining an abutment arm 22 and a spacing arm 24. The back-up range guide 10 also includes a mounting means 26 for mounting the lever arm 20 to the vehicle 14. The back-up range guide 10 also includes a biasing means for biasing the lever arm 20 towards its retracted configuration shown in FIG. 2. The back-up range guide 10 preferably further includes a signaling means 28 for emitting a visual signal that facilitates the detection of the distal end of the spacing arm 24 part of the lever arm 20. Referring now more specifically to FIG. 5, there is shown in greater details the configuration of the lever arm 20. The abutting arm 22 defines an abutting arm proximal end 30 and an opposed abutting arm distal end 32. The abutting arm distal end 32 is preferably provided with a curved tip section 34 so as to reduce the risk of injury or damage by contact with the latter. The abutting arm 22 can also include a perpendicular segment 36 adapted to extend substantially vertically to provide a vertical spacing between adjacent sections of the abutting arm 22. The spacing arm 24 also defines a spacing arm proximal end 38 and a spacing arm distal end 40. The spacing arm proximal end 38 preferably merges integrally and substantially perpendicularly with the abutting arm proximal end 30. The spacing arm 24 is also preferably provided with a perpendicular segment 42 providing a vertical spacing between adjacent sections of the spacing arm 24. It should be understood that the length of the perpendicular segments 36, 42 may be customized to the type of vehicle and application. The visual indicating means 28 is preferably positioned adjacent the spacing arm distal end 40. The visual indicating means 28 typically includes a light emitting component such as a light bulb or diode protectively enclosed within a casing formed by a base socket 44 mounted on the spacing arm 24 and a tinted translucent cap 46 attached thereto in a conventional manner. The light bulb or diode is electrically coupled to a power source such as the battery of the vehicle 14 by an electrical wire 48 preferably extending through a channel formed in spacing arm 24 as shown in greater details in FIGS. 6 and 7. The visual indicating means 28 preferably also includes a reflector component 50 mounted to a mounting segment 52 of the spacing arm 24 extending perpendicularity therefrom. The mounting means 26 includes a mounting plate 54 attached to the backside 12 of the vehicle by suitable attachment means such as screws 56. The mounting plate 54 has a mounting sleeve 58 extending from a lateral edge thereof. An axle or shaft 62 is releasably and rotatably mounted within the sleeve 58. The angled segment formed by the merging of the abutting and spacing arm proximal ends 30, 38 is fixedly attached to one of the longitudinal ends of the axle 62. In order to facilitate maintenance and potential repair to the back-up range guide 10, the shaft or axle 62 can be removed from within the sleeve 58 using a variety of means selected from the group comprised of but not limited to bolts, screws or stop washer ring 64 releasably secured to the shaft 62 with a resilient clip 66 extending through a corresponding clip aperture 68 formed transversally through the shaft 62. The biasing means typically includes a helicoidal type spring 70 wound around the shaft 62 and the adjacent shaft longitudinal end.

The spring 70 has the first end thereof 72 abutting against the plate 54 as shown on FIG. 7 and a second end thereof 74 at least partially wound around the spacing arm 24. In use, the truck 14 is adapted to be backed up as indicated by arrow 76 towards a wall 78 typically part of a loading dock. When the backside 12 of the truck reaches a predetermined spacing distance relative to the wall 78 part of the loading dock, the distal tip 34 of the abutting arm 22 contacts the wall 78 as shown in FIG. 3. The pressure created by the wall 78 forces the lever arm 20 to pivot about the shaft 62 thus causing the indicating means 28 to move laterally away from the lateral side 16 of the truck 14. The combination of the reflector 50 and the light emitting component sends a visual signal to the truck driver that the vehicle has reached the predetermined spacing distance from the wall 78. The displacement of the indicating means 28 being proportional to the decreasing spacing between the backside 12 and the wall 78, allows the driver to continuously monitor the relative positioning. As shown in FIG. 4, once the abutting arm 22 lies in a substantially parallel relationship relative to the backside 12, the spacing arm 24 has reached its full outward position. Conversely, when the vehicle 14 moves forward, allowing the abutting arm 22 of the lever arm 20 to clear the wall 78, the biasing means biases the lever arm 20 towards its original retracted configuration as shown in FIG. 2 wherein the spacing arm 24 lies in a generally parallel relationship with the lateral side 16 of the vehicle 14. It can be clearly seen from the above disclosed information that the angle between the abutting and spacing arms 22, 24 of the lever arm 20 may be customized for various vehicles and situations so as to vary the required spacing between the truck 14 and the wall 78 for initial contact with the distal Up 34 of the abutting arm 22 and that the angular relationship between the arms 22, 24 as well as the relative length ratio therebetween will determine the rate of deployment of the spacing arm 24 thus of the indicating means 28.

What is claimed:

1. A vehicle back-up guide comprising a lever arm, said lever arm defining an abutting arm and a spacing arm, said abutting and spacing arms being angled relative to each other;

said lever arm being pivotally mounted to a mounting means for mounting the lever arm to the rear side of a vehicle and the mounting means located at the apex of the lever arm;

a visual indicating means positioned at a distal end of said spacing arm;

a biasing means located on said mounting means for biasing said lever arm towards an initial configuration wherein said spacing arm is in a generally parallel relationship relative to a lateral side of said vehicle.

2. A vehicle back-up guide as recited in claim 1 wherein said indicating means includes a reflector and a light emitting means.

3. A vehicle back-up guide as recited in claim 1 wherein the said abutting arm has a distal end which is provided with a curved tip.

4. A vehicle back-up guide as recited in claim 1 wherein both the spacing arm and the abutting arm are preferably provided with a perpendicular segment providing a vertical spacing between adjacent sections of the said arms.

5. A vehicle back-up guide as recited in claim 1 wherein the visual indicating means typically includes a light emitting component such as a light bulb or diode protectively enclosed within a casing.

6. A vehicle back-up guide as recited in claim 1 wherein a reflector component mounted to a mounting segment of the spacing arm is extending perpendicularily therefrom.

7. A vehicle back-up-guide as recited in claim 1 wherein the basing means is typically a helicoidal spring.

8. A vehicle back-up guide as recited in claim 1 wherein the said mounting means is comprised of a shaft or axle removably and rotatably attached within a sleeve using a variety of means selected from the group-comprised of but not limited to bolts, screws or stop washer ring.

9. A method for operating a vehicle back-up guide as recited in claim 1 comprising the steps of: the vehicle backing-up and closing in on an object, the abutting arm, which has a distal end projecting substantially away from the vehicle, making contact with said object and being pushed towards the said vehicle, this automatically moving the spacing arm outwardly thus giving a visual indication of the relative distance of the vehicle to the object.

* * * * *